UNITED STATES PATENT OFFICE.

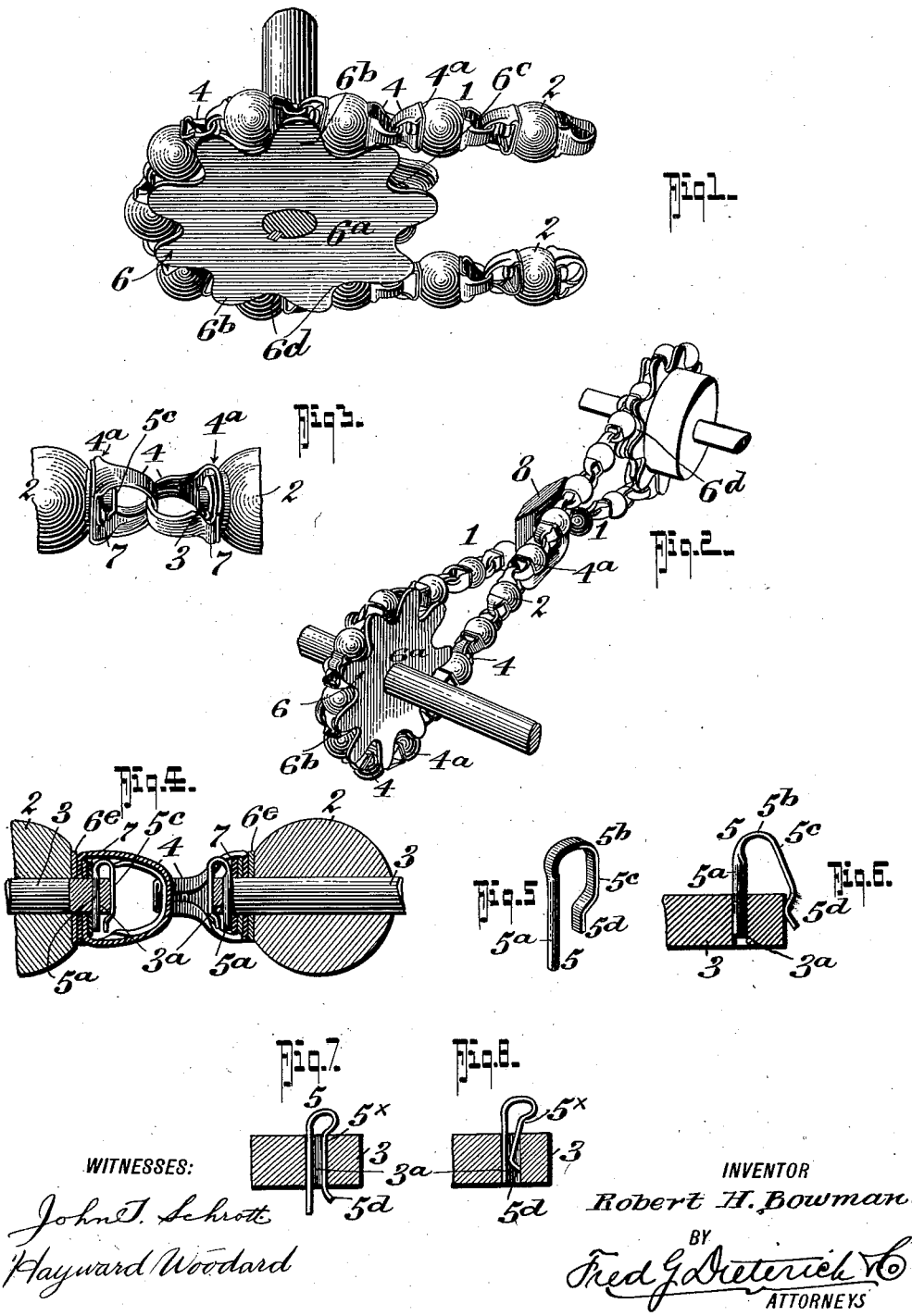

ROBERT HENRY BOWMAN, OF CANON CITY, COLORADO.

BALL SPROCKET CHAIN AND WHEEL.

No. 889,195.          Specification of Letters Patent.          Patented June 2, 1908.

Application filed February 8, 1908. Serial No. 414,919.

*To all whom it may concern:*

Be it known that I, ROBERT H. BOWMAN, residing at Canon City, in the county of Fremont and State of Colorado, have invented certain new and useful Improvements in Ball Sprocket Chains and Wheels, of which the following is a specification.

My invention relates to certain new and useful improvements in drive gearing of the sprocket and chain type which is more particularly adapted for use in connection with automobile drives and the like, and my invention is particularly designed so that the chain may be used as an ordinary sprocket chain for direct power transmission or it may run in a twist or may be run overlapped or crossed, as conditions may require.

In its generic nature, the invention embodies a chain composed of a series of balls, either hollow or solid, which are connected together by swivel link connections so that the chain may coöperate with a sprocket gear of a sheave wheel type having a circumferential groove with properly spaced ears or lugs at the sides forming open cups for the balls to rest in as the chain passes around the sprocket.

In its more subordinate nature, the invention embodies certain novel details of construction, combination and arrangement of parts, all of which will be first described in detail, then be specifically pointed out in the appended claims, and illustrated in the accompanying drawings, in which:—

Figure 1, is a perspective view of a sprocket wheel and chain embodying my invention. Fig. 2, is a similar view showing how the same may be run crossed. Fig. 3, is an enlarged detail perspective view of a pair of balls showing their swivel link connection. Fig. 4, is a central, longitudinal section of the parts shown in Fig. 3. Fig. 5, is an enlarged detail perspective view of the locking pin that coöperates with the ball bolts to hold the swivel links in position. Fig. 6, shows how the pin may be removed from the bolt. Figs. 7 & 8, are detail views that show a modified means for securing the swivel links to the ball bolts.

Referring now to the accompanying drawings, in which like letters and numerals of reference indicate like parts, 1 designates the chain which consists of the balls 2, the ball bolts 3, the swivel links 4 and the locking pins 5, together with the washers 6 and 7 that may be interposed between the swivel links 4, the balls 2 and the pins 5.

In the practical application of my invention, the balls 2 may be either hollow or solid and formed of any material that may be found desirable, the bolts 3 have their ends apertured as at $3^a$ to receive the locking pins 5, which are preferably formed, as shown in Fig. 5, of a cylindrical portion $5^a$, adapted to pass through the apertures $3^a$ and a resilient loop $5^b$ terminating in a flat portion $5^c$ to engage the end of the bolt 3 and an off-set portion $5^d$ to project over the bolt and prevent the pin slipping out of place. In order to remove the pin 5, it is only necessary to spring the off-set portion $5^d$ into a plane with the end of the bolt and move the pin out of the bolt aperture. The swivel links 4 may be made of any approved material and may be provided with overlapping ends $4^a$, apertured to receive the bolts 3, as indicated in Fig. 3.

Instead of using a locking pin 5 of the type shown in Figs. 1 to 5, of my invention, the same type of pin may be used as shown in Fig. 7, but in this form the pin 5 has its off-set portion $5^d$ projecting through the aperture $3^a$ and is provided with a supplemental off-set portion $5^x$ so that in order to remove the pin from the bolts it is only necessary to squeeze the loop together and withdraw the pin from the bolt aperture. The sprocket wheel 6, which is particularly adapted for use in connection with my chain, comprises the side disk portion $6^a$ having peripheral lugs $6^b$ arranged radially to coöperate with the annular groove $6^c$ formed in the periphery of the sprocket gear, the groove $6^c$ coöperating with pockets $6^d$ formed between the adjacent lugs $6^b$ to receive the balls 2.

When my sprocket chain is to be used crossed, as shown in Fig. 2, I prefer to interpose a wedge member 8, suitably supported in any approved manner, so that the links of the chain where they cross will not come in contact with one another and hence prevent any possible chance of binding the chain, due to its being crossed.

From the foregoing description taken in connection with the accompanying drawings, it is thought the complete construction, operation and many advantages of my invention will be readily understood by those skilled in the art to which the invention appertains, and I desire it understood that slight changes in the details of construction may be made without departing from the spirit of the invention or the scope of the appended claims.

What I claim is:

1. A sprocket chain comprising a series of balls, bolts passing therethrough, and link members swivelly connected to said bolts to link adjacent balls together.

2. A sprocket chain comprising a series of balls, bolts passing therethrough, link members swivelly mounted on said bolts, and locking pins passing through the bolts to retain the link members thereon.

3. A sprocket chain comprising a series of balls, bolts passing therethrough, link members swivelly mounted on said bolts, locking pins passing through the bolts to retain the link members thereon, and washers interposed between the balls and the link members.

4. A sprocket chain comprising a series of balls, bolts passing therethrough, link members swivelly mounted on said bolts, locking pins passing through the bolts to retain the link members thereon, washers interposed between the balls and the link members, and washers interposed between the link members and the locking pins.

5. A sprocket chain comprising a series of balls, bolts passing therethrough, link members swivelly mounted on said bolts, locking pins passing through the bolts to retain the link members thereon, and washers interposed between the link members and the locking pins.

ROBERT HENRY BOWMAN.

Witnesses:
J. T. CORRIN,
Mrs. H. R. McQUOWN.